United States Patent [19]

Hara et al.

[11] Patent Number: 4,686,080

[45] Date of Patent: Aug. 11, 1987

[54] COMPOSITE COMPACT HAVING A BASE OF A HARD-CENTERED ALLOY IN WHICH THE BASE IS JOINED TO A SUBSTRATE THROUGH A JOINT LAYER AND PROCESS FOR PRODUCING THE SAME

[75] Inventors: Akira Hara; Masaya Miyake; Shuji Yazu, all of Itami, Japan

[73] Assignee: Sumitomo Electric Industries, Ltd., Osaka, Japan

[21] Appl. No.: 805,590

[22] Filed: Dec. 9, 1985

Related U.S. Application Data

[63] Continuation of Ser. No. 440,705, Nov. 8, 1982, abandoned.

[30] Foreign Application Priority Data

| Nov. 9, 1981 | [JP] | Japan | 56-180053 |
| Nov. 9, 1981 | [JP] | Japan | 56-180054 |
| Jun. 24, 1982 | [JP] | Japan | 57-109171 |
| Aug. 23, 1982 | [JP] | Japan | 57-127650 |
| Aug. 23, 1982 | [JP] | Japan | 57-127651 |
| Aug. 24, 1982 | [JP] | Japan | 57-147370 |
| Aug. 27, 1982 | [JP] | Japan | 57-149649 |
| Aug. 31, 1982 | [JP] | Japan | 57-152112 |

[51] Int. Cl.[4] .............................................. B22F 7/08
[52] U.S. Cl. .................................. 419/8; 419/5; 419/11; 419/13; 419/26; 428/565; 428/627; 428/634; 428/638; 428/678; 428/683; 428/697; 428/698; 428/699; 428/932; 428/934; 51/307; 51/309; 175/329; 76/108 A

[58] Field of Search ............... 428/565, 627, 634, 638, 428/678, 683, 697, 698, 699, 932, 934; 51/307, 309; 219/121 LC, 121 LD, 121 EC, 121 ED; 175/329; 156/DIG. 68, DIG. 80, DIG. 102, DIG. 103; 419/5, 8, 11, 13, 26; 76/108 A

[56] References Cited

U.S. PATENT DOCUMENTS

| 4,063,909 | 12/1977 | Mitchell | 51/295 X |
| 4,098,362 | 7/1978 | Bonnice | 175/329 |
| 4,168,923 | 9/1979 | Vezirian | 219/121 ED X |
| 4,225,322 | 9/1980 | Knemeyer | 51/309 X |
| 4,232,094 | 11/1980 | Rhodes et al. | 428/627 X |
| 4,247,305 | 1/1981 | Daniels et al. | 51/307 |
| 4,359,112 | 11/1982 | Garner et al. | 175/329 |
| 4,403,015 | 9/1983 | Nakai et al. | 428/565 |

Primary Examiner—John F. Terapane
Assistant Examiner—Matthew A. Thexton
Attorney, Agent, or Firm—Wenderoth, Lind & Ponack

[57] ABSTRACT

A composite compact component made of a composite compact consisting of a diamond or BN powder bonded to a hard sintered alloy base during a sintering operation, and a substrate composed of steel or a hard sintered alloy bonded to the base of the composite compact through a high strength filler metal or alloy having a melting point of at least the liquidus point of the hard sintered alloy base. A process of making set composite compact component is also disclosed as well as a drill bit containing said composite compact component and variations thereof.

7 Claims, 20 Drawing Figures

COMPOSITE COMPACT HAVING A BASE OF A HARD-CENTERED ALLOY IN WHICH THE BASE IS JOINED TO A SUBSTRATE THROUGH A JOINT LAYER AND PROCESS FOR PRODUCING THE SAME

This application is a continuation of now abandoned application Ser. No. 440,705, filed Nov. 8, 1982.

BACKGROUND OF THE INVENTION

1. Field of the Invention

This invention relates to a composite compact material and a process for the production of the same and more particularly, it is concerned with a composite compact tool comprising a diamond or high pressure form boron nitride composite compact and a substrate bonded to the composite compact and a process for the production of the same.

2. Description of the Prior Art

Figure 1:
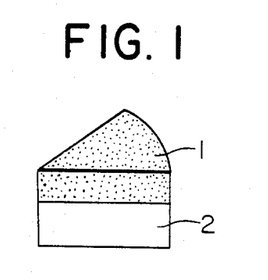
FIG. 1 is a perspective view of one example of a composite compact used in the present invention.

Lately, hard sintered body or compacts of diamond or boron nitride have been developed and put to practical use. The hard compacts have generally a composite structure in which compact layer 1 is bonded to base material 2 as shown in FIG. 1 and which is fixed to a tool substrate by brazing. Such a composite compact has been used for not only brazed cutting tools or throw-away inserts but also rotary cutting tools such as end mills and boring cutters.

The diamond or BN compacts, obtained by sintering diamond or BN fine powder with a binder of an iron group metal under an ultra-high pressure at a high temperature, have a much higher wear resistance than the prior art cemented carbides and are thus suitable for use in cutting tools, wire drawing dies and drill bits.

These compacts have the excellent properties as a tool material, but an ultra-high pressure apparatus is required for the production thereof. Thus, their size and shape are more restricted as compared with those of the cemented carbides.

Figure 2:
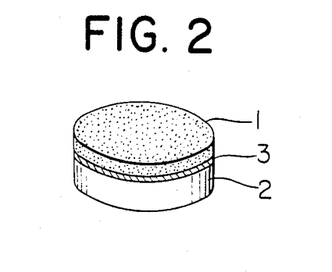
FIG. 2 is a perspective view of another example of a composite compact used in the present invention.

In general, a tool component is a disc-shaped composite compact as shown in FIG. 2, which comprises diamond or boron nitride compact 1, base 2 of cemented carbide for supporting compact 1 and intermediate joint layer 3 as described in Japanese Patent Application No. 129127/1979. This composite compact is bonded to a steel holder by brazing as it is disc-shaped or after cutting in a suitable shape to form a cutter, for example. However, it is found that when the diamond or boron nitride compact is heated at higher than about 700° C. for a certain period of time during the brazing, the properties are degraded. Thus, the brazing is carried out using a silver braze having a low melting point. For the general use such as cutting tools, this brazing method using a low melting point braze is sufficient if the cutting tool is used under such a condition that cutting stress is relatively small, but in the case of applying the compact to a drill bit for drilling rocks, this brazing method is not sufficient.

Figure 5A:
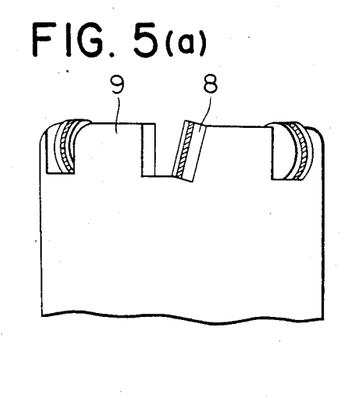
Figure 5B:
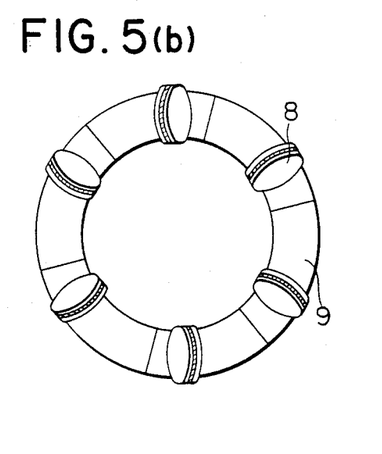

In a drill bit, a number of composite compacts as shown in FIG. 2 are mounted in a bit crown as shown in FIG. 5 and used as cutters, which is disclosed in, for example, U.S. Pat. No. 4,098,362. When drilling of rocks is carried out using a drill bit fabricated by mounting composite compacts as shown in FIG. 2 in a bit crown with a low melting point braze having a melting point of lower than 700° C., relatively soft rocks such as sandstone can be drilled without problem, but in the case of drilling hard rocks, some problems are encountered that the compact cutter falls off from the brazed part and the brazed part is moved. Silver braze (e.g., JIS B Ag-1) commonly used as a low melting point brazing material has a shearing strength of at most 20 kg/mm$^2$ at room temperature, which strength is markedly lowered at high temperatures. A drill bit meets with a large fluctuation of stress because to the drilling stress added to the edge is large and rocks are scarcely uniform. Furthermore, even if a drilling fluid such as mud is used, not only the temperature of the edge, but also that of the bit itself rise in the case of drilling a high depth stratum. Depending upon the kind of a stratum mud cannot be used sometimes.

When a diamond compact is applied to a drill bit, therefore, it is very important how to fix the compact as shown in FIG. 2 to a bit crown.

On the other hand, micro diameter drills of cemented carbides have been used for making holes in a printed circuit board in household electric appliances and electric measuring instruments. It is a difficult problem to make a hole with dimensional presicion and without forming burrs at the inlet or outlet of the hole, and making fine splits or seizures on the inner surface of the hole, in a printed circuit board consisting of a laminate of e.g. an epoxy resin and a thin copper plate.

Of late, composite hard compacts have widely been used and in particular, diamond compact tools have often been used for cutting non-ferrous alloys such as aluminum and plastics with a life prolonged several tens to several hundreds times as long as that of the commonly used cemented carbide tools. Accordingly, diamond compact tools are said to be very desirable materials as a tool for making a holes in printed circuit boards consisting of laminates of resins and copper.

Figure 4:
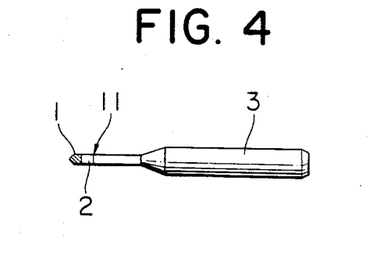
FIG. 4 is a schematic view of a composite micro drill using a composite compact according to the present invention.

A drill for making a hole in a printed circuit board is prepared by brazing and fixing a diamond compact blank to the end of the drill as shown in FIG. 4 in marrer similar to that of ordinary diamond compact tools, but is a high strength bond is hardly by each method because the drill diameter is generally less than 3 mm, more generally about 1 mm. That is, a silver braze having a melting point of about 650° to 700° C. is ordinarily used for brazing a diamond compact blank and this gives a brazing strength of only about 20 kg/mm$^2$ in terms of shearing strength. By this strength, there is a very high possibility that the diamond compact blank may be separated from the joint part by the cutting torque during drilling. When the inventors have made a drill as shown in FIG. 4 and carried out a drilling test of a printed circuit board, it is found that the blank is missed by one hole.

There are a number of brazing materials and some brazing materials having a higher brazing strength than silver brazes. However, in general, high strength brazing materials have a higher melting point and this is a problem. Intrinsically diamond is a thermodynamically unstable material under atmospheric pressure and thus tends to be transformed into graphite when the temperature is raised under atmospheric pressure. In the diamond compact as set forth above, particularly, this graphitization takes place through the reaction with a binder metal used in the compact at a temperature above 700° C. The boron nitride compact are also degraded at a temperature of above 700° C. Therefore, a brazing material to be used should have a melting point of lower than 700° C.

SUMMARY OF THE INVENTION

It is an object of the present invention to provide a composite compact tool.

It is another object of the present invention to provide a composite compact tool comprised of a diamond or BN composite compact and a substrate bonded to the composite compact.

It is a further object of the present invention to provide an improved cutter component for drill bits or for composite micro tools.

It is a further object of the present invention to provide an improved fabrication method for forming a high strength bond between a composite compact and a substrate.

It is a further object of the present invention to provide an improved process for the production of a composite compact tool component without degrading the particulate layer of the composite compact using a high energy beam.

These objects can be attained by a composite compact component or tool comprising a composite compact consisting of a diamond or BN compact containing 50% or more by volume of diamond or BN powder and a base of hard sintered alloy bonded during sintering under an ultra-high pressure and high temperature directly or through an interlayer with a thickness of 0.5 mm or less to the diamond or BN compact, and a substrate bonded to the composite compact, the substrate having a larger volume than the base, characterized in that the substrate is a hard sintered alloy or steel and the base and substrate are bonded through a high strength metal or alloy layer, as a filler metal, having a thickness of 2 mm or less and a melting point of at least the liquidus point of the hard sintered alloy.

BRIEF DESCRIPTION OF THE DRAWINGS

The accompanying drawings are to illustrate the principle and merits of the present invention in greater detail.

FIG. 3 (a) and (b) are perspective views of embodiments of composite compact tools to illustrate the production thereof according to the present invention.

FIG. 5 (a) and (b) are respectively a side view and plan view of one example of a drill bit using a composite compact according to the present invention.

FIG. 6 (a) and (b) are respectively a side view and plan view of another example of a drill bit using a composite compact according to the present invention.

FIG. 7 (a) and (b) are schematic views of embodiments of composite compact tools according to the present invention to illustrate the production thereof, in particular, where the base and substrate have respectively a projection and hollow, and vice versa.

FIG. 11 (a) and (b) are respectively a front view and side view of a micro tool using a composite compact according to the present invention.

FIG. 12 (a), (b), (c) and (d) are photomicrographs obtained by X-ray microanalyzer, multiplied 150 times, showing the interface of a hard sintered alloy and Ni filler bonded according to the present invention.

DETAILED DESCRIPTION OF THE INVENTION

The inventors have made efforts to develop an improved diamond or high pressure form boron nitride composite compact tool whereby the above described disadvantages of the prior art can be overcome and consequently, have found that the composite compact component or tool can be obtained by bonding the end of the base of the composite compact with a substrate using a filler metal having a higher melting point than both by means of a high energy beam such as an electron beam or a laser beam.

In this specification, the high pressure form boron nitride will be referred to as "BN" simply and defined as including cubic boron nitride (CBN) and wurtzitic boron nitride (wBN) as usual.

In a composite compact component or tool comprised of a composite compact consisting of a diamond on BN compact containing at least 50% by volume of diamond or BN powder and a base of hard sintered alloy bonded during sintering under an ultra-high pressure and high temperature directly or through an interlayer with a thickness of at most 0.5 mm to the diamond or BN compact, and a substrate having a larger volume than the base, bonded to the composite compact, the present invention provides an improvement characterized in that the substrate is a hard sintered alloy or steel, and the base and substrate are bonded through a high strength metal or alloy layer, as a filler metal, having a thickness of at most 2 mm and a melting point of at least the liquidus point of the hard sintered alloy or steel by the use of a high energy beam such as an electron beam or a laser beam. Furthermore, the present invention provides a process for the production of a composite compact tool or component which comprises sandwiching a thin sheet of high strength metal or alloy, as a filler metal, having a thickness of at most 2 mm between the end of a base of a composite compact and the end of a substrate of a hard sintered alloy or steel having a larger volume than the base, the composite compact consisting of a diamond or BN compact containing at least 50% by volume of diamond or BN powder and the base of a hard sintered alloy bonded during sintering under an ultra-high pressure and high temperature directly or through an interlayer with a thickness of at most 0.5 mm to the diamond or BN compact, then heating and melting the thin sheet at a temperature of at least the liquidus point of the hard sintered alloy by a high energy beam and thereby welding or bonding the base and substrate under such a state that the diamond or BN compact and hard sintered alloy are scarcely degraded.

As a filler metal for the joint layer of the base and substrate, capable of satisfying the above described requirements, there are used preferably iron group metals or alloys thereof, more preferably nickel and its alloys such as Fe-Ni alloys with a thermal expansion coefficient of at most $12 \times 10^{-6}/°C$., and as the high energy beam, there are preferably used electron beams and laser beams.

Figures 3A, 3B:
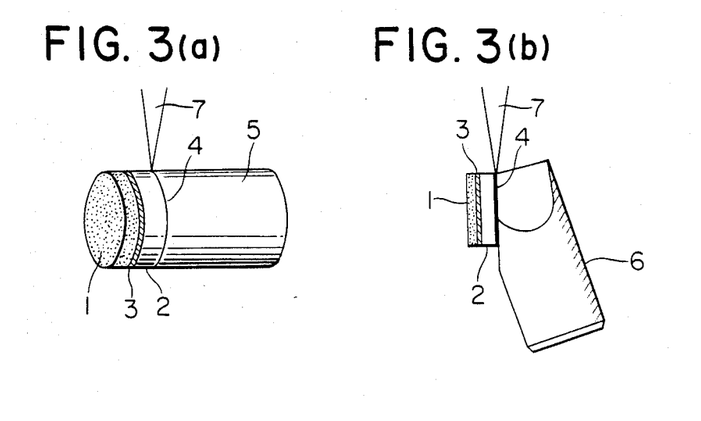

Referring to FIG. 3, one embodiment of the present invention will be illustrated.

1, 2 and 3 of FIG. 3 are the same as those of FIG. 2. In bonding a composite compact sintered under an ultra-high pressure and high temperature to a substrate 5 or 6 of a hard sintered alloy or steel, having a larger volume than a base 2, sheet 4 of a high strength metal or alloy having a thickness of 2 mm or less is sandwiched between base 2 and substrate 5 and melted and bonded instantaneously by the use of narrow high energy beam 7 such as an electron or a laser beam, as shown in FIG. 3. In general, the electron beam is irradiated at an accelerating voltage of 60 to 200 KV a beam current of 3 to 50 mA and a welding speed of 0.1 to 1 m/min.

The filler metal or alloy to be inserted between the base and substrate should be chosen from materials having a much higher bond strength after melted and solidified than the ordinary brazing materials, in particular, from iron group metals such as Fe, Ni and Co and their alloys containing iron group metals as a predominant component. In the prior art brazing method, a brazing material having a melting point lower than that of the base or substrate to be joined, i.e. lower than 1000° C. is generally used because it is necessary to heat at least one of the base and the substrate at a temperature higher than the melting point of the brazing material used in the ordinary brazing. In the present invention, on the contrary, it is possible to use a material having a higher melting point than the base to be bonded as the filler metal to thus obtain a higher strength bond than in the case of the ordinary brazing materials such as silver brazes, copper brazes and nickel brazes.

As the base of the diamond or BN compact (2 in FIG. 2 and FIG. 3 (a) and (b)), there are generally used hard sintered alloys consisting of at least one member selected from the group consisting of carbides, carbonitrides, nitrides and carboxynitrides of Zr, Hf, Cr, V, Nb and Ta elements of the Periodic Table and solid solutions thereof, bonded by a least one member selected from iron group metals. Preferred examples are hard sintered alloys consisting of WC or MoC or (Mo, W)C bonded with Co or Ni. For example, WC-Co alloys have a liquidus point of about 1320° C.

The substrate (5 in FIG. 3 (a) and 6 in FIG. 3 (b)) used in the present invention is made of hard sintered alloys, which can be the same as the base (2 in FIG. 3 (a) and (b)), or steels. As the steels, high speed steels, tool steels, structural steels and high strength steels are suitable. Since it is not required to heat the whole body of the substrate during bonding in the present invention, a quenched and hardened material can be used without softening. As the filler metal, iron group metals or alloys containing iron group metals as the main component are suitable and it is further desired that the filler metal has substantially the same coefficient of thermal expansion as the materials to be joined since there is no residual stress at the joint part. The base (2 of Fig. 3 (a) and (b)) used in the present invention is of the above described hard sintered alloy whose thermal expansion coefficient is in the range of 4 to $8 \times 10^{-6}/°C$. corresponding to the half or less of iron and steels. Therefore, the filler metal should be chosen from metals or alloys having a thermal expansion coefficient of $12 \times 10^{-6}/°C$. or less, preferably $10 \times 10^{-6}/°C$. or less, illustrative of which are Fe-Ni, Fe-Ni-Cr, Fe-Co-Cr alloys called Imver, Elimver or invariable steels, and the like. In the case where the substrate (5 in FIG. 3 (a) and 6 in FIG. 3 (b)) is of steel, it is preferable to choose a material having a medium value between the thermal expansion coefficients of the base (2 in FIG. 3 (a) and (b)) of a hard sintered alloy and that of the substrate.

Figure 6A:
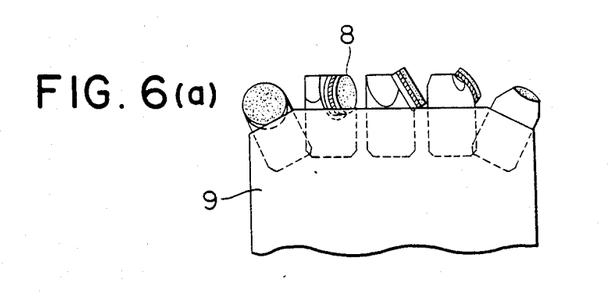

When using the composite compact according to this embodiment of the present invention as cutters for a drill bit, each cutter can strongly be fixed in a recess provided in the crown of the drill bit as shown in FIG. 6 by press-fitting or shrink fitting the substrate part (5 in FIG. 3 (a) and 6 in FIG. 3 (b)) of the cutter therein. When the substrate part has a larger volume, in particular, this fixing can be carried out without degrading the diamond or BN compact even by the ordinary brazing method. Furthermore, it will of course be apparent to those skill in the art that the bit body 9 of steel itself can be used as the substrate and a composite compact 8 without a substrate can directly be bonded thereto, as shown in FIG. 5.

In a preferred embodiment of the present invention, the hard materials in the hard sintered alloys of the base and substrate are diffused, dispersed and precipitated in a high strength metal or alloy as the filler metal, whereby the strength and wear resistance of the filler metal are further increased and the interfacial strength of the hard sintered alloy and filler metal is increase even. The substrate used herein (5 and 6 in FIG. 3) is of the same hard sintered alloy as that of the base (2 in FIG. 3) and the filler metal used herein is an iron group metal or its alloy. Particularly, Co or Ni is preferably used as the filler metal because Co or Ni is also used as the binder metal in the hard sintered alloy and does not result in metallurgical defects such as a lowered bond strength during melting and bonding. In the case of using Ni or Ni alloys as the filler metal, above all, there hardly takes place a reaction of the filler metal with, for example, a carbide such as WC or (Mo, W)C in the hard sintered alloy to form and precipitate a brittle composite carbide phase, and there is dispersed and precipitated a carbide having the same composition as WC or (Mo, W)C in the hard sintered alloy in the filler metal after being solidified, thus resulting in a much higher bond strength. The content of the hard material, such as carbides, dispersed and precipitated in the interlayer is preferably 0.1 to 60 vol. %, since if the content is less than 0.1 %, it is not desirable to increase the strength of the filler metal, while if more than 60%, the carbide is decomposed to form pores in the filler metal and to lower the strength thereof. The thickness of the filler metal is preferably 1 mm or less, since if the thickness exceeds 1 mm, the wear resistance of the filler metal is lower than that of the base or substrate.

In another embodiment of the present invention, as a filler metal for bonding the base and substrate, there is used another hard sintered alloy having a larger content of iron group metal than the hard sintered alloys of the base and substrate.

In this embodiment, the base and substrate are also bonded under such a condition that the diamond or BN compact is not degraded and to this end, a high energy narrow beam such as an electron beam or a laser beam is used as a heating source for localized heating to the joint part only. It is not impossible to heat and melt the hard sintered alloy itself to be joined, but by this procedure, it is difficult to obtain a bond with a sufficiently high strength. When a butt welding test by an electron beam is carried out using WC-12% Co alloy and the bond interface is observed, a number of pores are found and there is an abnormal phase due to decarburization in the structure. This is considered to be due to a part of the WC in the alloy being decomposed and combined with $O_2$ in the atmosphere to yield CO gas.

As a result of this test, it has been found that an alloy containing a larger amount of binder metal such as Co, in particular, containing Ni as a predominant component of the binder metal has few such defects. WC-Ni alloys have a larger range of carbon content in the alloy, in which the two phases can be stably present, than WC-Co alloys, so that an abnormal phase due to decarburization is hardly formed.

A hard sintered alloy used for the base and substrate of the diamond or BN compact should have a sufficient hardness and wear resistance as well as a sufficient rigidity to reinforce the compact layer, in particular, when the composite compact or blank is used as a cutter of a drill bit. Therefore, it is required to select an alloy with a binder metal in a suitable range and generally a binder metal quantity of 3 to 20% by weight is suitable for this purpose. As described above, however, an alloy with a further larger content of binder metal is suitable for bonding.

Accordingly, in this embodiment, another hard sintered alloy having a larger content of binder metal than the hard sintered alloys of the base and substrate is used as a filler metal and melted by a high energy beam to effect bonding. That is, this filler metal is a hard sintered alloy comprising 20 to 80% by weight of a binder metal and a carbide which is the same as or similar to the base or substrate as hard grains. If the quantity of the binder metal is less than 20% by weight, a weld defect tends to occur, while if more than 80% by weight, an increase of the strength due to the hard carbide grains cannot be maintained, but rather there is only obtained a strength similar to that of ordinary filler metals. As the hard carbide, WC or (Mo, W)C is preferable from the standpoint of strength and as the binder metal, Ni is superior to Co and Fe because of the above described reason. The thickness of the filler should be 2 mm or less, preferably 0.05 to 1 mm. If less than the lower range, the thickness is smaller than the beam diameter of the electron beam or laser beam and the base and substrate are partially fused. Since the filler material according to this embodiment is similar to the materials to be bonded and has a similar coefficient of thermal expansion thereto, there is little strain due to welding.

In another embodiment of the present invention, either the base or substrate has a projection portion and the other has a hollow portion. The base and substrate are contacted and bonded through a high strength metal or alloy with a thickness of at most 2 mm in such a manner that the projection is fixed into the hollow. The high strength metal or alloy has a melting point of at least the liquidus point of the hard sintered alloy, as set forth above.

Figures 7A, 7B:
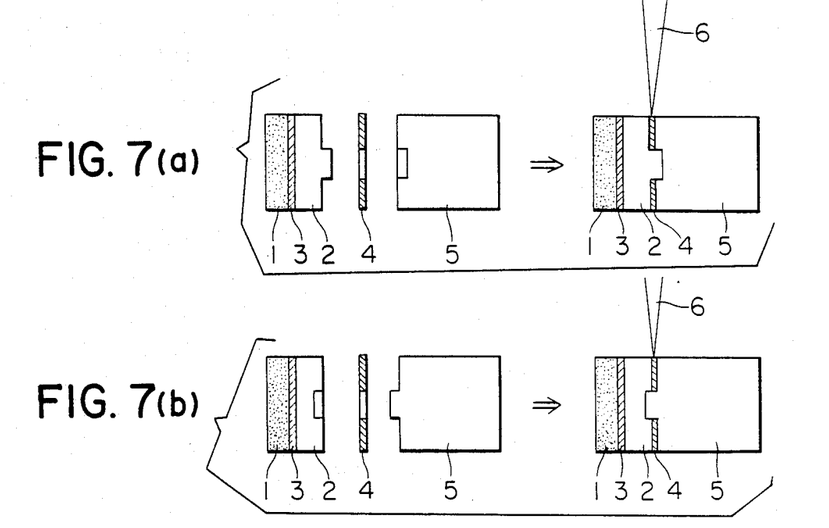

Referring to FIG. 7, this embodiment of the present invention will be illustrated.

1, 2 and 3 of FIG. 7 are the same as those of FIG. 2. In bonding a composite compact sintered under an ultra-high pressure and high temperature to a substrate 5 of a hard sintered alloy or steel, having a larger volume than that of the base 2, the base and substrate are worked as shown in FIG. 7, and sheet 4 of a high strength metal or alloy having a ring shape and a thickness of 2 mm or less is sandwiched therebetween and melted and bonded instantaneously by the use of narrow high energy beam 6 such as electron beam or laser beam, as shown in FIG. 7. The filler metal or alloy to be inserted in between the base and substrate should be chosen from materials having a much higher bond strength after melted and solidified than the ordinary brazing materials, in particular, from iron group metals such as Fe, Ni and Co and their alloys containing iron group metals as a predominant component. In this embodiment, it is made possible to use a material having a higher melting point than the base to be bonded as the filler metal to thus obtain a higher strength bond than in the case of the ordinary brazing materials such as silver brazes, copper brazes and nickel brazes.

In this embodiment, the base and substrate have respectively a projection and a hollow to be fit and this combination gives a very high shear strength. When using a diamond or BN compact for a drill bit, in particular, the joint part is exposed to a high shearing stress to cause separation thereof when the joint part is brazed, but the composite compact tool according to this embodiment is free from this problem because of its high shearing strength and high reliability.

When bonding is carried out by melting a filler metal by electron beam or laser beam, the melted part shrinks, so unless the filler metal is thoroughly melted up to the center, the base and diamond or BN compact become convex, thus resulting often in cracks. On the other hand, if the energy of electron beam or laser is increased so as to melt throughout all the area of the filler metal, the temperature of the central part is too high and the hard sintered alloy is decomposed to form pores and to lower the strength. According to the present invention, this problem can be solved by the use of a ring-shaped filler metal which can readily be melted even if the energy of the electron beam or laser is lowered. In addition, since this embodiment comprises fitting a projection and a hollow, it is important to position the compact and substrate correctly.

The materials of the base and substrate used in this embodiment are generally the same as those used in the above described embodiments.

When using steels as the substrate in the above described embodiments, the base can be directly bonded to the substrate without using a joint layer, i.e. a filler metal or alloy. In this case, as shown in FIG. 3, composite compact 1 is bonded to substrate 5 or 6 of steel by melting the contacted or butted surface 4 instantaneously using a narrow beam 7 of high energy, such as an electron or a laser beam. According to this embodiment, direct bonding is possible without the provision of an interlayer of a brazing material on the joint surface and is completed by heating only the joint part immediately before the diamond or BN compact reaches a temperature at which it is degraded. Substrate 5 or 6 used in this embodiment is generally of steel, preferably of steel subjected to a heat treatment, such as high speed steel or tool steel.

Use of electron beam, etc. in a method of bonding metals is already known as disclosed in Japanese Patent Application OPI (Kokai) No. 45288/1981, in which the bonding is carried out by applying an electron beam to one or both of the contacted surfaces of metals to be bonded, thus melting and bonding.

In the case of the hard sintered alloy and steel in combination as in this embodiment, however, the former contains a large amount of a heat resisting compound such as a carbide and thus the melting thereof is insufficient even if electron beam is applied to only the butted surface of the former side, while irradiation of only the butted surface of the latter side with electron beam results in a larger melting depth and remarkably lower bond strength. In the embodiment of the present invention, a high energy beam such as an electron beam is applied in such a manner that both the butted surfaces of the hard sintered alloy and the steel are irradiated, the base side of the hard sintered alloy is heated and the substrate side of steel is provided with a melt zone in a narrow range of the joint end, whereby the base and substrate can directly be bonded with a higher bond stength and without degrading the structure of the hard sintered alloy. One feature of this embodiment is that the melted layer is formed in the steel part and the hard sintered alloy part is not melted, so that no brittle layer is formed through reaction of the hard sintered alloy and steel.

When using a diamond or a BN compact as a tool, it is made possible by this embodiment to bond the compact to steel substrates with various shapes and to obtain a larger bond strength than in the commonly used brazing method. Furthermore, the application range of the composite compact of diamond or BN particles can be enlarged since the joint part has not only a higher shearing strength but also a higher resistance to fatigue under repeated stress and the strength is not lowered at high temperatures as compared with a jointed body wherein a brazing material is used as an interlayer.

A cemented carbide drag bit will be illustrated in which the composite compact component of the present invention is used as a part of cutter.

Figure 8:
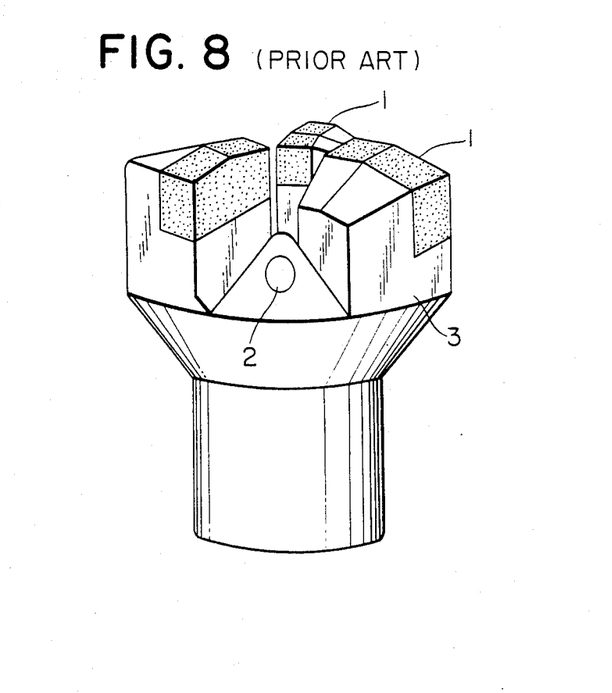
FIG. 8 is a perspective view of the prior art cemented carbide blade bit.

In order to find out the reasons why a cemented carbide drag bit is short-lived, the inventors have observed the wearing state of the cemented carbide blade when limestone having a compressive strength of 800 kg/cm$^2$ is drilled using the cemented carbide drag bit shown in FIG. 8. In this drilling test, the edge part, in particular, the exterior part of the cemented carbide blade is worn to blunt the edge and to increase the drilling resistance and the temperature of the edge rises to lower the strength of the edge, leading to breakage. Thus, it is found necessary to increase the wear resistance of the cemented carbide blade in order to lengthen the life thereof.

The above described diamond or BN compact has excellent features as a tool material, but since an ultrahigh pressure apparatus is required for the production, the compact is restricted considerably as to its shape or size and is expensive. Accordingly, this drag bit is made for trial considering that use of a diamond or BN compact on only an area of cemented carbide blade to be much worn as shown in FIG. 9 results in a lengthened life of the bit and a decreased production cost.

In this case, bonding of the composite diamond or BN compact should also be carried out so that there can be obtained a bond strength which is high and not lowered at high temperatures. The inventors have made various studies as to this bonding and consequently, have found that a high strength bond can be obtained without degrading the diamond compact by arranging the composite compact and cemented carbide blade through a high strength metal or alloy having a thickness of at most 1 mm and a melting point of at least energy beam such as electron beam or laser beam to the metal or alloy and thereby melting and bonding only the metal or alloy. As the filler metal or alloy, there are preferably used iron group metals such as Fe, Ni and Co and alloys thereof containing iron group metals as a main component.

Figure 9:
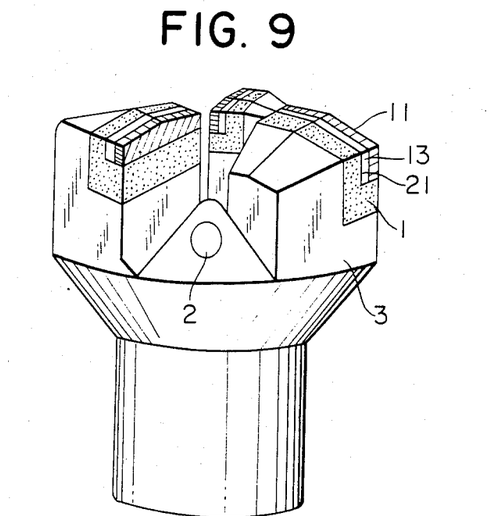
FIG. 9 is a perspective view of one example of a blade drag bit using a composite compact according to the present invention.
Figure 10:
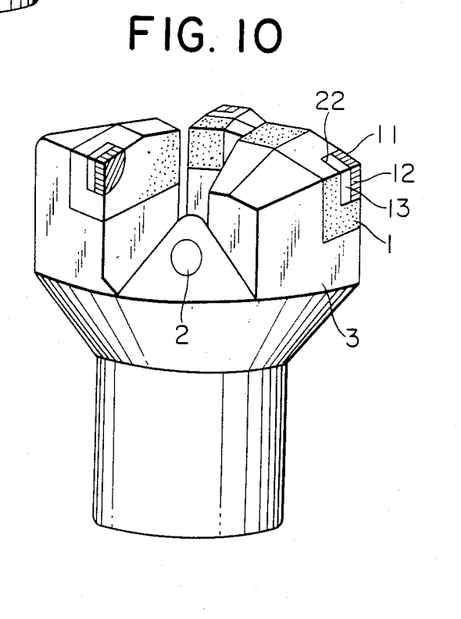
FIG. 10 is a perspective view of another example of a blade drag bit using a composite compact component according to the present invention.

Referring to FIG. 9 and FIG. 10, a cemented carbide blade 1 used in this embodiment is a cemented carbide which is the same as or similar to that of base 13 (2 of FIG. 2). Co or Ni is preferably used as the filler metal because Co or Ni is also used as the binder metal in the cemented carbide and does not result in metallurgical defects, such as lowering of the bond strength during melting and bonding. In the case of using Ni or Ni alloys as the filler metal(21 of FIG. 9 and 22 of FIG. 10), above all, there hardly takes place a reaction of the filler metal with, for example, a carbide such as WC or (Mo, W)C in the cemented carbide to form and precipitate a brittle composite carbide phase and there is dispersed and precipitated a carbide having the same composition as WC or (Mo, W)C in the cemented carbide in the filler metal after solidified, thus resulting in a much higher bond strength.

The present invention has mainly been illustrated as to the preferred embodiments when applied to drill bits, but is of course useful for other uses, for example, cutting tools, drilling tools, dressers of grinding wheel and wear resisting tools, in particular, in the case where the joint area of a compact cutter and tool substrate is relatively small and the bond strength is lacking when the materials are bonded by the ordinary brazing method.

In a composite micro tool, for example, a composite compact as a cutter is bonded to a tool by an electron beam. As well known in the art, electron beam welding is carried out by emitting an electron beam in a vacuum, irradiating the part to be welded with the beam and heating and melting it by the energy of electron beam. Since the diameter of the irradiated beam can be focussed to 0.5 mm or less, only the part to be welded is spot-like heated. Moreover, the welding can be completed in a short time because of the very high energy density of the electron beam, and a bond strength can be obtained which corresponds substantially to the strength of the materials to be welded. This is achieved by melting and bonding these materials themselves when they are welded to each other directly or through a filler inserted between them. That is to say, a high strength bond can be obtained by electron beam welding without raising substantially the temperature of the composite compact. In this case, the same materials as set forth above can be used as the filler.

The merits obtained by electron beam welding are as follows: When 4 to 6 composite compacts should be fixed as a cutter in a tool such as a reamer with a diameter of about 10 mm or less, the whole body of the tool is heated during brazing in the prior art. Thus, it is very difficult to position simultaneously all the composite compact cutters on the outer circumference during brazing for the purpose of brazing correctly. On the contrary, in electron beam welding, welding can be carried out by heating only a part to be welded while positioning the cutters one by one.

Figures 11A, 11B:
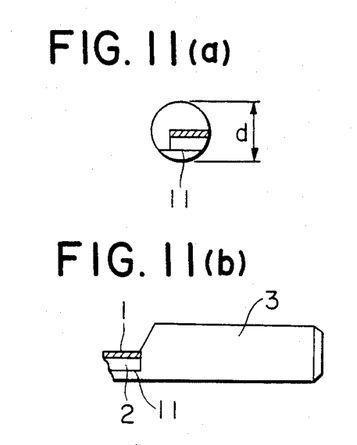
Figure 12A:
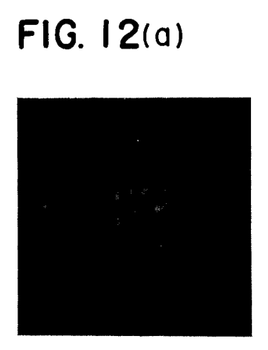
Figure 12B:
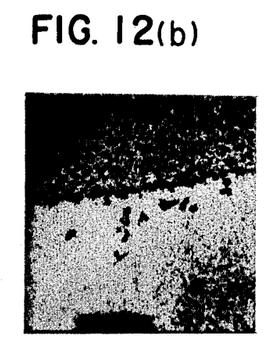
Figure 12C:
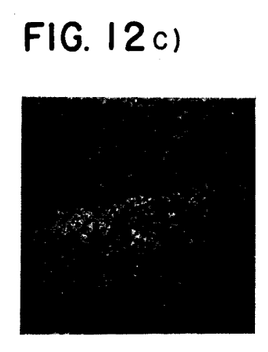
Figure 12D:
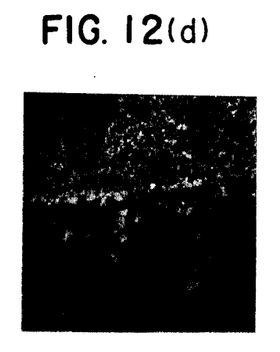

The above described composite micro tool is, for example, an end mill as shown in FIG. 11, in which a hard compact 1 is bonded by an electron beam to the end of tool body 3 of steel through interface 11 of base 2 and tool body 3. Diameter d of tool body 3 is 2 mm and no filler metal is used.

In addition to the above described composite micro tool, there is provided, for example, a composite micro diameter drill comprising a diamond compact containing at least 70% by volume of diamond, fixed as a cutter, in which the diamond compact blank is bonded to the drill body by electron beam welding.

The following examples are given in order to illustrate the present invention in greater detail without limiting the same.

EXAMPLE 1

Diamond compact 1 with a diameter of 10 mm and a thickness of 0.5 mm as shown in FIG. 2 was prepared by sintering about 90% by volume of diamond grains with Co as a binder under an ultra-high pressure and high temperature. Base 2 of WC- 6% Co, having a thickness of 3 mm, was simultaneously bonded to diamond compact 1 when it was sintered through interlayer 3 with a thickness of 40 $\mu$m, consisting of a compact of 60% by volume of CBN and TiN-10 wt % Al. This composite diamond compact was bonded to substrate 5 with a diameter of 10 mm and a length of 10 mm, made of WC-12% Co, using sheet 4 with a diameter of 10 mm and a thickness of 0.3 mm, made of Fe- 42% Ni, as a filler metal. After degreasing, washing and demagnetizing, these components were combined as shown in FIG. 3 (a), charged in a vacuum chamber and subjected to electron beam welding 7 under an accelerating voltage of 100 KV, beam current of 20 mA, beam diameter of about 0.3 mm and welding speed of 0.5 m/min (welding time: about 1 sec per one sample), thus fusing the filler metal.

For comparison, another sample was prepared by brazing the same composite compact and substrate with a silver brazing material (JIS BAg-1).

The resulting both samples were subjected to measurement of the shearing strength at normal temperature and at 350° degrees C., thus obtaining results of 70 Kg/mm$^2$ at normal temperature and 65 Kg/mm$^2$ at 350° degrees C. for the sample of the present invention and on the other hand, 20 Kg/mm$^2$ and 12 Kg/mm$^2$ for the comparative sample. Examination of the cross section of the welded part showed that there was a diffusion layer of W and Co from the cemented carbides of the base and substrate in the melted and solidified part of the filler metal, Fe-Ni alloy, but both the cemented carbides had normal structures free from decarburization layers.

EXAMPLE 2

Six composite diamond compacts 8 having the same structure as used in Example 1 were bonded to bit body 9 made of SCM steel directly by electron beam welding. This bonding was carried out in an analogous manner to Example 1 using a core bit body with a diameter of 60 mm shown in FIG. 5 (a) and (b) as a substrate and a sheet of Ni with a thickness of 0.5 mm as a filler metal.

When andesite having a monoaxial compressive strength of 1200 Kg/cm$^2$ was drilled by the resulting core bit at a drilling speed of 10 cm/min, drilling of 20 m was possible without missing of the cutters.

EXAMPLE 3

Diamond compact 1 with a diameter of 10 mm and a thickness of 0.5 mm as shown in FIG. 2 was prepared by sintering about 90% by volume of diamond grains with Co as a binder under an ultra-high pressure and high temperature. Base 2 of WC-6%Co, having a thickness of 3 mm, was simultaneously bonded to diamond compact 1 when sintered through inter-layer 3 with a thickness of 30 $\mu$m, consisting of a compact of 60% by volume of CBN and TiN- 10 wt % Al. The resulting composite diamond compact was bonded to substrate 5 of WC- 12%Co, having a diameter of 10 mm and a length of 10 mm, using sheet 4 of Ni, having a diameter of 11 mm and a thickness of 0.5 mm, as a filler metal. After degreasing, washing and demagnetizing, these components were combined as shown in FIG. 3 (a), charged in a vacuum chamber and subjected to electron beam welding under an accelerating voltage of 150 KV, beam current of 6 mA and beam diameter of 0.3 mm for 2 seconds, thus fusing the Ni filler metal. After welding, the composite compact sample was cut and subjected to observation by an X-ray microanalyzer to obtain results as shown in FIG. 12 (a), (b), (c) and (d).

In the each micrograph of FIG. 12, the upper part shows the base of the composite diamond compact, i.e. WC- 6% Co alloy phase and the lower part shows the Ni filler phase. FIG. 12 (a), (b), (c) and (d) are respectively a back scattered electron image, Ni X-ray image, Co X-ray image and W X-ray image. W and Co, the components of WC-Co alloys, were diffused in the Ni filler metal and WC, the hard material, was precipitated in a proportion of 15% by volume. Ni was also diffused in the cemented carbides.

Then, the shearing strength of the joint part was measured. For comparison, another sample was prepared by brazing the same composite compact and substrate with a silver braze corresponding to JIS BAg-1 and similarly subjected to measurement of the shearing strength. Consequently, the sample of the present invention showed 80 Kg/mm$^2$ at normal temperature and 70 Kg/mm$^2$ even at 350° degrees C., while the comparative sample showed respectively 20 Kg/mm$^2$ and 12 Kg/mm$^2$.

EXAMPLE 4

Composite diamond compact having the same structure as used in Example 3, as shown in FIG. 3 (a), was press-fit in a bit body made of SCM steel to prepare a core bit having a diameter of 60 mm and three cutters. For comparison, a composite diamond compact comprising a commercially sold diamond compact for a bit, bonded to a cemented carbide by brazing, was similarly adapted to a bit body of SCM steel to prepare a core bit.

When andesite having a monoaxial compressive strength of 1700 Kg/cm$^2$ was drilled at a rate of 50 m/min by 20 m using these core bits, the bit of the present invention was free from missing of the compact cutters and capable of further use, while the comparison bit met with missing of the two diamond compacts from the brazed part.

EXAMPLE 5

A diamond compact having a thickness of 0.5 mm and comprising 80% by volume of diamond grains sintered with binders of (Mo, W)C, Ni and Co under an ultra-high pressure and high temperature was directly bonded to a base of (Mo, W)C-15% Co alloy with a diameter of 14 mm to prepare a composite diamond compact blank with a thickness of 3.5 mm.

The resulting composite diamond compact was bonded to a substrate of (Mo, W)C- 20% Ni- 5% Co alloy, having a diameter of 14 mm and a length of 5 mm. For the examination of the bond strength by a filler metal, the diamond compact blank and substrate were bonded through a sheet of Ni, Co or Fe having a diameter of 15 mm and a thickness of 0.6 mm as a filler metal by applying electron beam under an accelerating voltage of 150 KV, beam current of 10 mA and beam diameter of 0.3 mm for 5 seconds. The shearing strengths of the resulting samples measured at normal temperature were 85 Kg/mm² in the case of using Ni as the filler metal, 79 Kg/mm² in the case of using Co and 70 Kg/mm² in the case of using Fe.

EXAMPLE 6

Diamond compact 1 with a diameter of 10 mm and a thickness of 0.5 mm as shown in FIG. 2 was prepared by sintering about 90% by volume of diamond grains with Co as a binder under an ultra-high pressure and high temperature. Base 2 of WC- 12% Co alloy, having a thickness of 3 mm, was simultaneously bonded to diamond compact 1 when sintered through intermediate joint layer 3 with a thickness of 40 μm, consisting of a compact of 60% by volume of CBN and TiN- 10 wt % Al. The resulting composite diamond compact was bonded to substrate 5 of WC- 12% Co alloy, having a diameter of 10 mm and a length of 10 mm, using sheet 4 of WC- 30% Ni alloy, having a diameter of 10 mm and a thickness of 0.3 mm, as a filler metal. After degreasing, washing and demagnetizing, these components were combined as shown in FIG. 3 (a), charged in a vacuum chamber and subjected to electron beam welding under an accelerating voltage of 150 KV, beam current of 15 mA, beam diameter of about 0.3 mm and welding speed of 0.5 m/min (welding time: about 1 second per one sample), thus fusing the filler metal.

For comparison, another sample was prepared by brazing the same composite compact and substrate with a silver brazing material (JIS BAg-1).

The resulting both samples were subjected to measurement of the shearing strength at normal temperature and at 350° C., thus obtaining results of 80 Kg/mm² at normal temperature and 75 Kg/mm² even at 350° C. for the sample of the present invention and on the other hand, 20 Kg/mm² and 12 Kg/mm² for the comparative sample.

EXAMPLE 7

The procedure of Example 6 was repeated except using, in place of the WC- 30% Ni alloy as the filler, a compact of mixed powders of WC and 30% by weight of Ni, subjected to intermediate sintering at 700° C. for 30 minutes, thus obtaining similar results to those of Example 6.

EXAMPLE 8

Figure 6B:
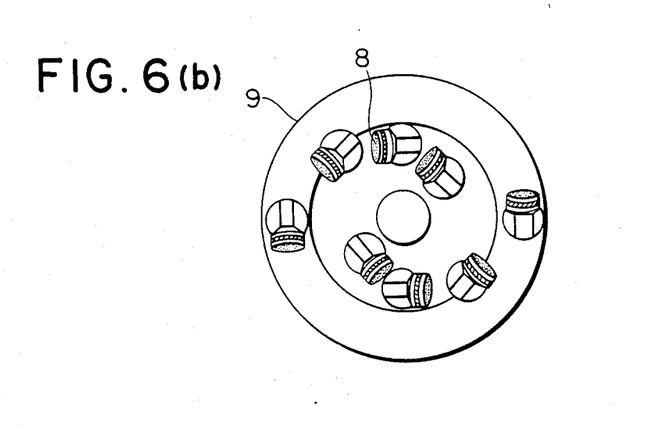

A diamond compact as shown in FIG. 2 was prepared by sintering under an ultra-high pressure and high temperature in an analogous manner to Example 6 and bonded to a substrate of WC- 20% Co alloy, having a shape as shown in FIG. 3 (b), 6, through a sheet of $(Mo_{0.5}W_{0.5})C$- 30% Ni- 30% Co alloy, having a thickness of 0.5 mm by electron beam welding under the welding conditions similar those of Example 6. Eight samples of composite diamond compact component 8 were prepared and press-fit in bit body 9 of steel to thus obtain a bit having a bit diameter of 76.2 mm, as shown in FIG. 6 (a) as a front view and (b) as a plan view. For comparison, another bit was prepared using a composite diamond compact brazed with a silver braze, as shown in FIG. 3 (b).

When these samples were subjected to a drilling test of andesite with a compressive strength of 1700 Kg/cm² at a drilling rate of 50 cm/min, the bit using the cutter of the present invention was capable of drilling by at least 50 m without any problem, while the other comparative bit was broken in drilling only by 10 m. In the latter sample, the diamond compact was missed from the brazed part.

EXAMPLE 9

A composite diamond compact was prepared by bonding a diamond compact to a base of WC- 12% Co alloy similar to Example 6 and bonded to a substrate having a diameter of 10 mm and a length of 10 mm through a filler material having a thickness of 0.5 mm by electron beam welding, the materials of the substrate and filler being varied as shown in Table 1. The shearing strength of the welded joint part of the each sample was measured to obtain results tabulated below:

TABLE 1

| Alloy of Substrate | Filler Material | Shearing Strength at 350° C. (Kg/mm²) |
| --- | --- | --- |
| WC—0.5 Cr₃C₂—6 Co—6 Ni | WC—50 Ni | 75 |
| " | WC—25 Ni—5 Fe | 80 |
| WC—1 TaC—10 Co | WC—1 TaC—20 Ni | 70 |
| $(Mo_{0.5}W_{0.5})C$—25 Ni | $(Mo_{0.5}W_{0.5})C$—40 Ni | 65 |
| WC—1TaC—1 NbC—10 Co | " | 65 |
| WC—1 TiC—6 Co—6 Ni | WC—0.5 VC—20 Co | 55 |
| WC—1 ZrC—6 Co—6 Ni | WC—20 Ni—5 Co | 50 |

EXAMPLE 10

Diamond compact 1 with a diameter of 10 mm and a thickness of 0.5 mm as shown in FIG. 2 was prepared by sintering about 90% by volume of diamond grains with Co as a binder under an ultra-high pressure and high temperature. Base 2 of WC- 6% Co alloy, having a thickness of 3 mm, was simultaneously bonded to diamond compact 1 when it was sintered through interlayer 3 with a thickness of 40 μm, consisting of a compact of 60% by volume of CBN and TiN- 10 wt % Al. Then, the cemented carbide base was worked so as to have a projection of 3 mm in outer diameter and 1 mm in height, as shown in Fig, 7 (a). In addition, an Ni plate having an outer diameter of 11 mm, inner diameter of 3.05 mm and thickness of 0.3 mm and a cemented carbide substrate having an inner diameter of 3.05 mm and depth of 1 mm were prepared. These components were combined as shown in FIG. 7 (a), charged in a vacuum chamber and subjected to electron beam welding with revolving under an accelerating voltage of 150 KV, beam current of 5 mA and beam diameter of 0.3 mm for 2 seconds. When the sample after welded was observed, the composite diamond compact and cemented carbide were strongly bonded without cracks.

For comparison, comparative sample 1 was prepared by brazing the same compact and substrate with a silver braze corresponding to JIS BAg-1 and comparative sample 2 was prepared by electron beam welding of the flat surfaces of the diamond compact base and cemented carbide substrate using a Ni plate with a thickness of 0.3 mm. When these samples were subjected to measurement of the shearing strength at normal temperature and at 350° C., the sample of the present invention was not broken by 100 Kg/mm² at normal temperature and even at 350° C., while comparative samples 1 and 2 showed respectively 20 Kg/mm² and 12 Kg/mm², and 60 Kg/mm² and 50 Kg/mm².

EXAMPLE 11

A composite diamond compact having the same structure as used in Example 9 as shown in FIG. 2 and steel substrate were worked as shown in FIG. 7 (b) and bonded by electron beam welding using a sheet of Fe-Ni with a thickness of 0.5 mm as a filler metal. Then, this steel substrate was pressfit into a bit body made of SCM steel to make a core bit having four cutters.

When this core bit was subjected to a drilling test of andesite having a monoaxial compressive strength of 1700 Kg/cm$^2$ at a drilling speed of 20 cm/min, drilling of 30 m was possible without separation of the cutters.

EXAMPLE 12

Diamond compact 1 with a diameter of 10 mm and a thickness ness of 0.5 mm as shown in FIG. 2 was prepared by sintering about 90% by volume of diamond grains with Co as a binder under an ultra-high pressure and high temperature. Base 2 of WC- 6% Co cemented carbide, having a thickness of 3 mm, was simultaneously bonded to diamond compact 1 when it was sintered through interlayer with a thickness of 40 μm, consisting of a compact of 60% by volume of CBN and TiN- 10 wt % Al. The resulting composite diamond compact was bonded to substrate 5 with a diameter of 10 mm and a length of 10 mm, made of hot die steel SKD 11 (HRC 55). After degreasing, washing and demagnetizing, these components were combined as shown in FIG. 3 (a), charged in a vacuum chamber and the butted ends of the base and steel substrate were irradiated with electron beam under an accelerating voltage of 100 KV, beam current of 20 mA, beam diameter of about 0.3 mm and welding rate of 0.5 m/min (welding time: about 1 second per one sample), thus fusing the steel and bonding.

For comparison, another sample was prepared by brazing the same composite compact and substrate with a silver brazing material (JIS BAg-1).

The resulting both samples were subjected to measurement of the shearing strength at normal temperature and at 350° C., thus obtaining results of 55 Kg/mm$^2$ at normal temperature and 50 Kg/mm$^2$ even at 350° C. for the sample of the present invention and on the other hand, 20 Kg/mm$^2$ and 12 Kg/mm$^2$ for the comparative sample. Examination of the cross section of the welded part showed that there was no brittle layer due to diffusion of Fe, e.g. Fe$_3$W$_3$C in the WC-Co base, while there were W and Co diffused in the joint layer melted and solidified in the steel side with a width of about 0.5 mm, but there was no structure change in a zone apart from the joint part by 1 mm or more. The hardness of the joint layer of steel melted and solidified was Hv 800, rather increased more than the original hardness 600.

EXAMPLE 13

Four composite diamond compacts 8 having the same structure as used in Example 12, as shown in FIG. 2, were directly bonded to bit body 9 made of SCM steel by electron beam welding. This bonding was carried out in an analogous manner to Example 12 using core bit body 7 with a diameter of 60 mm shown in FIG. 5 (a) and (b) as a substrate.

When andesite having a monoaxial compressive strength of 1200 Kg/cm$^2$ was drilled by the thus resulting core bit at a drilling rate of 10 cm/min, drilling of 30 m was possible without separation of the cutters.

EXAMPLE 14

Diamond compact 1 with a diameter of 13 mm and a thickness of 0.8 mm as shown in FIG. 2 was prepared by sintering about 90% by volume of diamond grains with Co as a binder under an ultra-high pressure and high temperature. Base 2 of WC- 6% Co, having a thickness of 2 mm, was simultaneously bonded to diamond compact 1 when it was sintered through interlayer 3 with a thickness of 50 μm, consisting of a compact of 60% by volume of CBN and TiN- 10 wt % Al. The resulting composite diamond compact was divided into three equal parts to give a 120° segment and bonded to cemented carbide blade 1 through Ni plate 22 with a thickness of 0.5 mm as a filler metal as shown in FIG. 10 by electron beam welding under an accelerating voltage of 150 KV and beam current of 8 mA. Using this bit, limestone was drilled by dry process at 80 rpm and bit weight of 80 to 100 Kg. For comparison, comparative sample 1, i.e. cemented carbide blade bit and comparative sample 2 prepared by brazing the above described composite diamond compact to a cemented carbide blade with a silver braze were also subjected to a drilling test. Consequently, the sample of the present invention could further be used even after drilling 100 m, while comparative sample 1 was broken and exhausted by 50 m and comparative sample 2 met with missing of the diamond compact from the brazed part when drilling 30 m.

EXAMPLE 15

Composite diamond compact blank 1+2 was bonded to the end of drill body 3 consisting of a cemented carbide through joint surface 11 by electron beam welding, worked in a shape of drill with a diameter of 1 mm by grinding and then subjected to a drilling test of a printed circuit board, as shown in FIG. 4.

When a three-laminated base plate was subjected to drilling at 60,000 rpm and a feed of 0.05 mm/rev, a comparative drill made of cemented carbide K 10 having the same shape met with formation of considerable burr by 3000 hits, while the above described composite micro diameter drill of the present invention reached substantially the same drilling state by 100,000 hits.

EXAMPLE 16

Composite compact consisting of 60% by volume of CBN and the balance of a binder phase of 85% by weight of TiN and 15% by weight of Al, having a thickness of 0.5 mm, was bonded to a base of WC- 10% Co alloy, having a thickness of 0.5 mm during sintering under an ultra-high pressure and high temperature to prepare a composite compact. The resulting composite compact was then bonded to a cutter holder of WC- 10% Co alloy, having a diameter of 3 mm through an Ni foil having a thickness of 0.2 mm as a filler metal by electron beam welding under an accelerating voltage of 60 KV, beam current of 10 mA and vacuum of 10$^{-2}$ Torr for 2 seconds, thus obtaining a boring cutter.

For comparison, a similar boring cutter was prepared by brazing the same materials with a silver braze.

In a fine boring test of quenched steel with a hardness of HRc 65, the performances of these cutters were compared under the following conditions:

| | |
|---|---|
| cutting speed | 80 m/min |
| depth of cut | 0.2 mm |

-continued

| feed | 0.1 mm/rev |
|---|---|
| diameter of hole made | 20 mm |
| depth of hole | 30 mm | cutting speed 80 m/min
depth of cut 0.2 mm
feed 0.1 mm/rev
diameter of hole made 20 mm
depth of hole 30 mm The boring cutter of the present invention was capable of being repeatedly used by repolishing even after making 500 holes, while the comparison cutter met with missing of the CBN compact from the brazed part when making 50 holes.

EXAMPLE 17

Composite compact consisting of 90% by volume of CBN and the balance of a binder phase of Co and a small amount of Al, having a width of 2 mm and length of 2 mm, was bonded to a base of WC- 10% Co alloy during sintering under an ultrahigh pressure and high temperature to prepare a composite compact. The resulting composite compact was then bonded to a cutter holder of WC- 10% Co alloy, having a diameter of 4 mm through a Ni thin sheet having a thickness of 0.2 mm as a filler metal by means of a $CO_2$ laser welding apparatus, thus obtaining an end mill, as shown in FIG. 11.

For comparison, a similar end mill was prepared by brazing the same materials with a silver braze.

In a working test of die steel with a hardness of HRc 65, the end mill of the present invention was resistant to use for a long time, while the comparison end mill met with missing of the compact from the brazed part at the initial stage of working.

What is claimed is:

1. A process for the production of a composite compact component, which comprises sandwiching a thin sheet of a high strength metal or alloy, as a filler metal, having a thickness of at most 2 mm between the end of a base of a composite compact and the end of a substrate of a hard sintered alloy or steel having a larger volume than the base, the composite compact consisting of a diamond or BN compact containing at least 50% by volume of diamond or BN powder and the base of a hard sintered alloy bonded during sintering under an ultra-high pressure and high temperature directly or through an interlayer with a thickness of at most 0.5 mm to the diamond or BN compact, then heating and melting the thin sheet at a temperature of at least the liquidus point of the hard sintered alloy by a high energy electron or laser beam and thereby welding or bonding the base and substrate; said hard senitered alloy consisting of at least one member selected from the group consisting of carbides, carbonitrides, nitrides and carboxynitrides of Ti, Zr, Hf, Cr, V, Nb, W, Mo, and Ta and solid solutions thereof, bonded by at least one member selected from iron group metals, and wherein the filler metal has a melting point at least as high as that of the liquidus point of the hard sintered alloy.

2. The process of claim 1, wherein from the ends of the base and substrate, hard compounds in the hard sintered alloys are diffused, dispersed and precipitated in the melted sheet.

3. A process for the production of a composite compact component, which comprises forming a projection or a hollow at the end of a base of a composite compact consisting of a diamond or BN compact containing at least 50% by volume of diamond or BN powder and a base of a hard sintered alloy bonded during sintering under an ultra-high pressure and high temperature directly or through an interlayer with a thickness of at most 0.5 mm to the diamond or BN compact, forming a hollow or a projection at the end of a substrate consisting of a hard sintered alloy or steel and having a larger volume than the base, sandwiching a ring-shaped thin sheet of a high strength metal or alloy, having a thickness of at most 2 mm between the base and substrate, then heating and melting the thin sheet at a temperature of at least the liquidus point of the hard sintered alloy by a high energy electron or laser beam and thereby welding or bonding the base and substrate, said sintered alloy consisting of at least one member selected from the group consisting of carbides, carbonitrides, nitrides and carboxynitrides of Ti, Zr, Hf, Cr, V, Nb, W, Mo and Ta and solid solutions thereof, bonded by at least one member selected from iron group metals.

4. A process for the production of a composite compact component, which comprises sandwiching a powder, green compact or sintered body of a hard sintered alloy, as a filler, between the end of a base of a composite compact and the end of a substrate of a hard sintered alloy having larger volume than the base, the composite compact consisting of a diamond or BN compact containing at least 50% by volume of diamond or BN powder and a base of a hard sintered alloy bonded during sintering under an ultra-high pressure and high temperature directly or through an interlayer with a thickness of at most 0.5 mm to the diamond or BN compact and the hard sintered alloy of the filler having a larger content of an iron group metal than the hard sintered alloys of the base and substrate, then heating and melting the filler by a high energy electron or laser beam and thereby welding or bonding the base and substrate, said sintered alloy consisting of at least one member selected from the group consisting of carbides, carbonitrides, nitrides and carboxynitrides of Ti, Zr, Hf, Cr, V, Nb, W, Mo and Ta and solid solutions thereof, bonded by at least one member selected from iron group metals.

5. The process of claim 4, wherein the base, substrate and filler are of hard sintered alloys containing WC or (Mo, W)C optionally with at least one member selected from the group consisting of carbides of Ti, Zr, Hf, Cr, V, Nb, and Ta, as a hard phase, and 3 to 80% by weight of an iron group metal, as a binder metal.

6. The process of Claim 4, wherein the hard sintered alloys of the base and substrate contain an iron group metal in a proportion of 3 to 20% by weight and the hard sintered alloy of the filler contains 20 to 80% by weight of Ni, O to.60% of Co and O to 60% by weight of Fe.

7. A process for the production of a composite compact component, which comprises contacting the end of a base of a composite compact consisting of a diamond or BN compact containing at least 50% by volume of diamond or BN powder and the base of a hard sintered alloy bonded during sintering under an ultra-high pressure and high temperature directly or through an interlayer with a thickness of at most 0.5 mm to the diamond or BN compact with a substrate of steel having a larger volume than the base, applying a high energy electron or laser beam in such a manner that both the contacted surface of the base and substrate is irradiated, thereby melting the contacted surface of the steel substrate and welding and bonding the base and substrate, said sintered alloy consisting of at least one member selected from the group consisting of carbides, carbonitrides, nitrides and carboxynitrides of Ti, Zr, Hf, Cr, V, Nb, W, Mo and Ta and solid soluions thereof, bonded by at least one member selected from iron group metals.

* * * * *